United States Patent
Less et al.

(10) Patent No.: US 9,728,759 B2
(45) Date of Patent: Aug. 8, 2017

(54) SEPARATOR FOR ELECTROCHEMICAL CELL AND METHOD FOR ITS MANUFACTURE

(71) Applicant: A123 Systems, LLC, Waltham, MA (US)

(72) Inventors: Gregory B. Less, Ypsilanti, MI (US); Angela Knapp, Ann Arbor, MI (US); Susan J. Babinec, Midland, MI (US)

(73) Assignee: A123 Systems LLC, Waltham, MA (US)

( * ) Notice: Subject to any disclaimer, the term of this patent is extended or adjusted under 35 U.S.C. 154(b) by 0 days.

(21) Appl. No.: 14/227,588

(22) Filed: Mar. 27, 2014

(65) Prior Publication Data

US 2015/0072219 A1    Mar. 12, 2015

Related U.S. Application Data

(62) Division of application No. 12/196,203, filed on Aug. 21, 2008, now Pat. No. 8,697,273.

(Continued)

(51) Int. Cl.
*H01M 2/16* (2006.01)
*H01M 4/13* (2010.01)
(Continued)

(52) U.S. Cl.
CPC .......... *H01M 2/168* (2013.01); *H01M 2/166* (2013.01); *H01M 2/1673* (2013.01);
(Continued)

(58) Field of Classification Search
CPC combination set(s) only.
See application file for complete search history.

(56) References Cited

U.S. PATENT DOCUMENTS

| | | | | |
|---|---|---|---|---|
| 5,587,253 A | * | 12/1996 | Gozdz | ........... C08J 9/28 429/217 |
| 5,948,464 A | | 9/1999 | Delnick | |

(Continued)

FOREIGN PATENT DOCUMENTS

| | | |
|---|---|---|
| CN | 1776955 A | 5/2006 |
| CN | 101002347 A | 7/2007 |

(Continued)

OTHER PUBLICATIONS

NMP data sheet.*

(Continued)

*Primary Examiner* — Daniel Gatewood
(74) *Attorney, Agent, or Firm* — McCoy Russell LLP

(57) ABSTRACT

An electrode/separator assembly for use in an electrochemical cell includes a current collector; a porous composite electrode layer adhered to the current collector, said electrode layer comprising at least electroactive particles and a binder; and a porous composite separator layer comprising inorganic particles substantially uniformly distributed in a polymer matrix to form nanopores and having a pore volume fraction of at least 25%, wherein the separator layer is secured to the electrode layer by a solvent weld at the interface between the two layers, said weld comprising a mixture of the binder and the polymer. Methods of making and using the assembly are also described.

13 Claims, 11 Drawing Sheets

Related U.S. Application Data

(60) Provisional application No. 60/957,101, filed on Aug. 21, 2007.

(51) Int. Cl.
*H01M 4/74* (2006.01)
*H01M 10/0525* (2010.01)
*H01M 10/0585* (2010.01)
*H01M 10/18* (2006.01)
*H01M 4/66* (2006.01)
*H01M 10/0569* (2010.01)

(52) U.S. Cl.
CPC ............ *H01M 2/1686* (2013.01); *H01M 4/13* (2013.01); *H01M 4/745* (2013.01); *H01M 10/0525* (2013.01); *H01M 10/0585* (2013.01); *H01M 10/18* (2013.01); *H01M 4/661* (2013.01); *H01M 10/0569* (2013.01)

(56) References Cited

U.S. PATENT DOCUMENTS

| | | | |
|---|---|---|---|
| 6,153,337 A | 11/2000 | Carlson et al. | |
| 6,180,281 B1 | 1/2001 | Schneider et al. | |
| 7,964,311 B2 | 6/2011 | Han et al. | |
| 2004/0053122 A1* | 3/2004 | Sugiyama | H01M 2/1653 429/144 |
| 2005/0031942 A1 | 2/2005 | Hennige et al. | |
| 2005/0158630 A1* | 7/2005 | Lambert | H01M 2/145 429/251 |
| 2005/0266305 A1* | 12/2005 | Ohata | H01M 2/1646 429/144 |
| 2006/0008700 A1* | 1/2006 | Yong et al. | 429/144 |
| 2006/0046149 A1 | 3/2006 | Yong et al. | |

FOREIGN PATENT DOCUMENTS

| | | |
|---|---|---|
| EP | 1667254 A1 | 6/2006 |
| EP | 1753056 A1 | 2/2007 |
| JP | H0525305 A | 2/1993 |
| JP | 2000235868 A | 8/2000 |
| JP | 2001266949 A | 9/2001 |
| JP | 2002512430 A | 4/2002 |
| JP | 2003187872 A | 7/2003 |
| JP | 2004273282 A | 9/2004 |
| JP | 2006147569 A | 6/2006 |
| JP | 2007125821 A | 5/2007 |
| WO | 9420995 A2 | 9/1994 |
| WO | 9936981 A1 | 7/1999 |
| WO | 9938224 A1 | 7/1999 |
| WO | 9954953 A1 | 10/1999 |
| WO | 0173871 A2 | 10/2001 |
| WO | 2005117169 A1 | 12/2005 |
| WO | 2006113924 A2 | 10/2006 |
| WO | 2007088707 A1 | 8/2007 |

OTHER PUBLICATIONS

Bottino, Solubility parameters of poly(vinylidene fluoride), J poly sci: part B polymer physics, 26, 785-794.*

Shinmura, Izuru, "Kōjien Third Edition," 1983, p. 1352, Iwanami Shoten, Tōkyō, 2 pages (submitted with partial translation).

Tarascon, J.-M. et al., "Performance of Bellcore's Plastic Rechargeable Li-Ion Batteries," Solid State Ionics, vol. 86-88, pp. 49-54, 1996, 6 pages.

Venugopal, Ganesh et al., "Characterization of Microporous Separators for Lithium-Ion Batteries," Journal of Power Sources, vol. 77, pp. 34-41, 1999, 8 pages.

Gamsjäger, Heinz et al., "Glossary of Terms Related to Solubility," Pure Applied Chemistry, vol. 80, No. 2, pp. 233-276, 2008, 44 pages.

ISA Korea, International Search Report of PCT/US2008/073924, Jan. 19, 2009, WIPO, 2 pages.

"Micropore in catalysis," IUPAC Compendium of Chemical Terminology, Jun. 12, 2009, IUPAC, Research Triagle Park, NC, http://dx.doi.org/10.1351/goldbook.M03906, Updated Feb. 24, 2014, 1 page.

European Patent Office, Extended European Search Report of Application No. 08827786.8, Nov. 17, 2011, Netherlands, 14 pages.

Office Action of Chinese Application No. 200880112058.8, Issued May 30, 2012, State Intellectual Property Office of PRC, 9 pages (submitted with partial translation).

Examination Report of European Application No. 08827786.8, Issued Oct. 10, 2012, European Patent Office, 8 pages.

Examination Report of European Application No. 08827786.8, Issued May 30, 2013, European Patent Office, 7 pages.

Office Action of Japanese Application No. 2013-187114, Issued Dec. 9, 2014, Japan Patent Office, 19 pages (submitted with partial translation).

European Patent Office, Extended European Search Report of Application No. 14195382.8, Jun. 15, 2015, Germany, 11 pages.

* cited by examiner

| Total thickness | Number of Times coated & dried before cure |
|---|---|
| 3A: 5 microns | one pass |
| 3B: 17 microns | three passes |
| 3C: 13 microns | one pass |

Laminated cell cycle life

SEPARATOR FOR ELECTROCHEMICAL CELL AND METHOD FOR ITS MANUFACTURE

CROSS-REFERENCE

This application is a divisional application of U.S. patent application Ser. No. 12/196,203 filed on Aug. 21, 2008, to be issued on Apr. 15, 2014 as U.S. Pat. No. 8,697,273, which claims priority to U.S. Provisional Application No. 60/957,101, filed Aug. 21, 2007, which are herein incorporated by reference in their entirety.

COPYRIGHT NOTICE

This patent disclosure may contain material that is subject to copyright protection. The copyright owner has no objection to the facsimile reproduction by anyone of the patent document or the patent disclosure as it appears in the U.S. Patent and Trademark Office patent file or records, but otherwise reserves any and all copyright rights.

INCORPORATION BY REFERENCE

All patents, patent applications and publications cited herein are hereby incorporated by reference in their entirety in order to more fully describe the state of the art as known to those skilled therein as of the date of the invention described herein.

FIELD OF THE INVENTION

This invention relates generally to electrochemical cells. More specifically, the invention relates to battery cells. Most specifically, the invention relates to separator membranes for electrochemical battery cells

BACKGROUND OF THE INVENTION

Separator membranes are important components of batteries. These membranes serve to prevent contact of the anode and cathode of the battery while permitting electrolyte to pass there through. Additionally, battery performance attributes such as cycle life and power can be significantly affected by the choice of separator. Safety can also be related to separator attributes, and certain separators are known to reduce occurrence of Li metal plating at the anode and even dendrite formation.

Separator membranes of battery cells are, in some instances, formed from bodies of porous polymer materials. In other instances, separator membranes are formed from bodies of fibrous or particulate material, and such materials can include glass fibers, mineral fibers such as asbestos, ceramics, synthetic polymeric fibers as well as natural polymeric fibers such as cellulose.

There are a number of problems with the presently utilized separator membranes. Such membranes materials are often expensive, and given the fact that a typical battery system will include relatively large volumes of membranes, the cost of the membranes can be a significant component of overall battery costs. Typical separator membranes used in prior art lithium ion cells are made from polymers such as polyethylene or polypropylene, and they may be fabricated in either a wet or a dry process. In a wet process, polymers of differing molecular weights and an oil are first blended, and then melt extruded to yield a film. The film is subsequently subjected to an extraction ("wet") step, in which the oil/low molecular weight polyolefins are extracted from the higher molecular weight solid film to leave a porous film. In the dry process for a three layer film, separate layers of polymer film are laminated, drawn down, and annealed so as to provide a polymer structure which has oriented crystallites. The sheet is then rapidly uniaxially stretched to obtain porosity. A similar process is used for dry processing of single layer films. These processes are relatively expensive, and membranes produced thereby have costs in the range of several dollars per square meter. The high cost of the separators translates to high cost for finished cells. Any reduction in the cost of the membrane will translate to significant savings in the overall cost of batteries. In addition, polymer separators must maintain their size and shape as temperatures are increased beyond the usual operating temperatures, to assure continued physical separation between anode and cathode. Many separators shrink unacceptably at increased temperatures and unacceptably allow the two electrodes to contact each other and thereby causing the cell to rapidly discharge, further contributing to unsafe increases in cell temperature. It is an important safety feature for the separators to maintain shape and original size and to avoid electrode contact at high temperatures.

Inorganic composite materials have also been used as separators. Such composite separators include a silica (or other ceramic) filler material and a polymer binder. The filler and binder are blended and extruded to form a composite sheet and any volatile components are removed by extraction or evaporation to form a porous body. Other examples blend the filler and binder to form a mixture that is applied to a substrate by various coating means, such as doctor blading, roll coating or screen, stencil printing or gravure. In many cases, the composite separator materials contain a very high content of inorganic filler. In some instances, the separators exhibit poor properties, such as mechanical properties.

Low cost battery separator membrane materials can be inefficient in preventing dendrite bridging, and hence must be made relatively thick. However, this thickness increases the internal resistance of the battery thereby decreasing its efficiency, and also increases battery size. In addition, various separator materials are fragile, and this fragility can complicate the manufacture of battery systems and both increase cost to manufacture a cell and potentially compromise safety.

Thus, there is a need for separator membranes which are efficient, low in cost, safe and easy to utilize.

SUMMARY

A separator for electrochemical cells is described. This separator is a composite of inorganic particles and polymeric binder. The separator composite materials are low in cost and function to provide high performance separator membrane structures which have excellent adhesion to electrodes and which improve safety by reduction of Li plating. Their high dimensional stability at high temperatures also enhances safety. Furthermore, the membrane materials may be directly coated onto electrodes of the battery thereby simplifying fabrication and handling procedures. The electrode/membrane assembly exhibits excellent adhesion between the layers and does not delaminate from its substrate (current collector) even when wound, bent, flexed or otherwise deformed.

In one aspect, separator for an electrochemical cell includes a porous composite layer adhered on a porous support, the composite layer comprising electrochemically stable inorganic particles having a particle size less than 1 µm in an electrochemically stable polymer matrix, said layer having at least a bimodal pore distribution, wherein the first, smaller sized pores are substantially uniformly distributed in the layer, and one or more larger pore sizes are randomly distributed in the layer, wherein the dimension of the pores are nanoscale.

In another aspect of the invention, an electrode/separator assembly for use in an electrochemical cell, comprising a current collector; a porous composite electrode layer adhered to the current collector, said electrode layer comprising at least electroactive particles and a binder; and a porous composite separator layer comprising inorganic particles substantially uniformly distributed in a polymer matrix to form nanopores and having a pore volume fraction of at least 25%, wherein the separator layer is secured to the electrode layer by a solvent weld at the interface between the two layers, said weld comprising a mixture of the binder and the polymer.

In one embodiment, the separator has a monomodal pore size distribution and the pore size has a value in the range of 5-500 nm.

In one embodiment, the separator has a monomodal pore size distribution and a first smaller pore size is in the range of about 5-100 nm.

In one embodiment, separator has a monomodal pore size distribution and a larger pore size is in the range of about 100-500 nm, or in the range of about 100-200 nm.

In one embodiment, the particles are substantially monodisperse and have a particle size in the range of about 10-500 nm, or in the range of about 10-50 nm, or in the range of about 10-20 nm.

In one embodiment, the layer has a pore volume fraction of greater than 25%.

In one embodiment, the composite layer comprises inorganic particles and polymer binder in a weight ratio of about 95:5 to about 35:65 inorganic particles: polymer, or the composite layer comprises inorganic particles and polymer in a weight ratio of about 65:35 to about 45:55.

In one embodiment, the polymer comprises a polymer which is electrochemically compatible with Li-ion cells.

In one embodiment, the polymer is selected from the group of latex polymers and polyvinylidene fluoride-based polymers.

In one embodiment, the inorganic material is selected from the group consisting of silica, alumina, natural and synthetic zeolites and other electrochemically stable inorganic particles of appropriate particle size, and is for example, fumed silica.

In one embodiment, the separator layer has a total thickness in the range of about 2 lam to about 40 µm, or a total thickness in the range of about 10 µm to about 20 µm.

In one embodiment, an electrode layer is disposed on upper and lower surfaces of the current collector and a separator electrode is disposed on both electrode layers.

In one embodiment, the separator layer is substantially free of cracks or defects.

In another aspect, a method of preparing a electrode/separator assembly for an electrochemical cell includes providing a porous composite electrode layer comprising at least electroactive particles and a binder; providing a coating solution, said coating solution comprising a polymer, solvent system for said polymer, and inorganic particles dispersed in said solvent, wherein said solvent system is selected to have at least some solubility for the binder of the electrode layer; coating a surface of said electrode layer with a layer of said coating solution, wherein the coating solution penetrates a fraction of the thickness of the electrode layer and dissolves a portion of the binder; and removing the solvent from said coating solution layer to deposit a porous separator layer comprising inorganic particles substantially uniformly distributed in the polymer and having a pore volume fraction of at least 25% and to form a solvent weld at an interface between said porous electrode layer and said porous separator layer.

In one embodiment, the method further comprises curing said polymer.

In one embodiment, curing comprises heat treating the assembly.

In one embodiment, the weight ratio of inorganic particles and polymer in the coating solution is about 95:5 to about 35:65.

In one embodiment, the weight ratio of inorganic particles and polymer in the coating solution is about 65:35 to about 45:55.

In one embodiment, the solvent system is a mixture of solvents and the solvents include a first liquid that is a solvent for the binder and a second liquid that is a poorer solvent for the binder than the first liquid and the proportion of first and second liquids is selected to limit the dissolution of the binder during the coating step.

In one embodiment, the solvent system is a mixture of solvents and the solvents include a first liquid that is a solvent for the binder and a second liquid that increases the viscosity of the coating solution and the proportion of first and second liquids is selected to reduce the penetration of the coating solution into the thickness of the electrode layer.

In one embodiment, the solvent system comprises N-methylpyrrolidone, or the solvent system comprises a mixture of N-methylpyrrolidone and a diluting solvent selected from the group consisting of acetone, propyl acetate, methyl ethyl ketone and ethyl acetate.

In one embodiment the coating solution penetrates up to 90% of the thickness of the electrode layer, or up to 50% of the thickness of the electrode layer, or up to 25% of the thickness of the electrode layer, or up to 10% of the thickness of the electrode layer.

In one embodiment, coating is carried out by a technique selected from the group consisting of spray coating, doctor blading, slot die coating, gravure coating, ink jet printing, spin coating and screen printing.

In one embodiment, spray coating the surface of said electrode comprises spray coating a plurality of layers of said coating solution onto said surface of said electrode.

In one embodiment, the method further includes drying the coated layer between each spray coating step.

In one embodiment, removing said solvent comprises evaporating said solvent, or extracting said solvent with a material which is a non-solvent for said polymer.

In another aspect, a method of preparing a defect-free separator membrane is provided, where defects are defined as discontinuities which short the cell or permit unacceptably high leakage currents for an electrochemical cell, or otherwise reduce performance in cycling and pulsing the cell currents. The method includes providing a coating solution, said coating solution comprising a polymer having a melting temperature, a solvent for said polymer, and an inorganic material dispersed in said solvent; providing a support; coating a surface of said support with a plurality of layers of said coating solution with drying by heat after each deposition, each said layer depositing a portion of the final thickness; and subjecting the membrane with the desired thickness to a stress-relieving treatment, whereby a porous body comprised of said polymer and said inorganic is deposited on said surface of said electrode, said body comprising being substantially free of cracks and other defects.

In one embodiment, the method further removing the solvent from said layer prior to the step of stress-relieving treatment.

In one embodiment, the stress-relieving treatment comprises heating the layer to soften the polymer.

In another aspect a laminate electrochemical cell includes a stack of layers arranged to provides a positive electrode layer/separator layer/negative electrode layer/separator layer repeat unit, where the positive electrode layer comprises a porous composite positive electrode layer adhered to both sides of a positive current collector, said electrode layer comprising at least electroactive particles and a binder; the negative electrode layer comprises a porous composite negative electrode layer adhered to a both sides of a negative current collector, said electrode layer comprising at least electroactive particles and a binder; the separator layer comprises a porous composite separator layer comprising inorganic particles substantially uniformly distributed in a polymer matrix to form nanopores, wherein each separator layer is bonded to an adjacent electrode layer through a solvent weld at an interface between the separator layer and the electrode layer.

In one embodiment, the separator layers comprise about 40-65 wt % polymer.

In one embodiment, the separator layer has a pore volume fraction of at least 25%.

In one embodiment, the resistance of the cell is greater than 20 MΩ.

In one embodiment, the cell further comprises an electrolyte.

In one embodiment, the separator layer has a total thickness in the range of about 2 µm to about 40 µm.

In one embodiment, the inorganic particles of the separator layer are substantially monodisperse and have a particle size has a value in the range of about 10-500 nm, or in the range of about 10-50 nm.

In one embodiment, the separator has a pore size distribution and the pore size has a value in the range of 5-500 nm.

In one embodiment, the separator layer comprises inorganic particles and polymer in a weight ratio of about 65:35 to about 45:55.

In another aspect, a method of making a laminate electrochemical cell includes providing stacked cell units comprising a plurality of positive electrode layer/separator layer/negative electrode layer/separator layer repeat units, where the positive electrode layer comprises a porous composite positive electrode layer adhered to both sides of a positive current collector, said electrode layer comprising at least electroactive particles and a binder; the negative electrode layer comprises a porous composite negative electrode layer adhered to a both sides of a negative current collector, said electrode layer comprising at least electroactive particles and a binder; the separator layer comprises a porous composite separator layer comprising inorganic particles substantially uniformly distributed in a polymer matrix to form nanopores; and applying heat and/or pressure to the stacked cell units to soften the binder and polymer of the electrode and separator layers and fuse adjacent separator and electrode layers to form a solvent weld.

In one embodiment, the separator layer is wetted with a solvent prior to application of heat and/or pressure.

BRIEF DESCRIPTION OF THE DRAWING

The invention is described with reference to the figures listed below, which are presented for the purpose of illustration only and are not intended to be limiting of the invention.

DETAILED DESCRIPTION

A porous composite membrane having simplified fabrication, improved safety, and enhanced operational performance is described. The porous composite membrane can be used as a separator membrane in an electrochemical device such as a battery, for example, a secondary Li ion battery. The separator can be formed with strong adhesion to the electrode layer, while maintaining the integrity of the electrode/current collector assembly. This is an attractive feature as many solvent-applied systems (as will be discussed in greater detail below) tend to delaminate the electrode from the underlying current collector. In addition, the separator membrane can be prepared over a range of porosity, while providing adequate ionic conductivity and mechanical strength.

Figure 1:
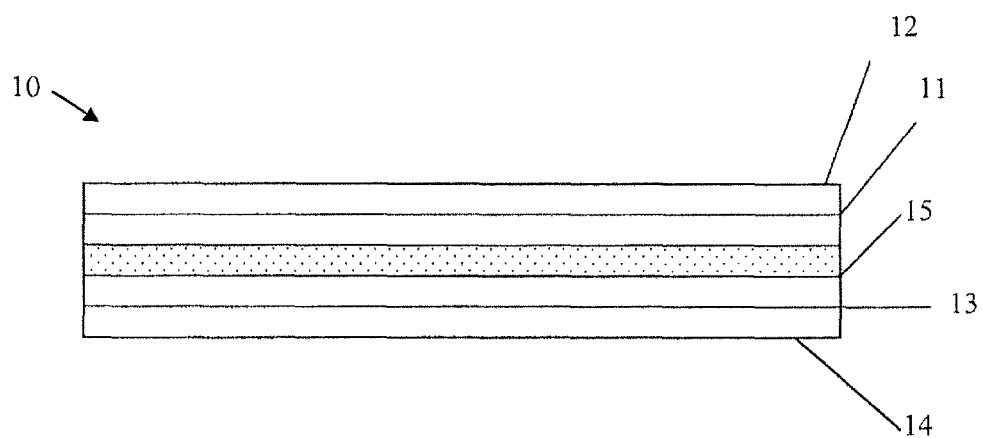
FIG. 1 is a schematic illustration of an electrochemical cell including a porous separator according to one or more embodiments of the invention.

Reference is made to FIG. 1, which illustrates an exemplary electrochemical cell 10 including a cathode active layer 11, a cathode substrate or current collector 12, an anode active layer 13 and an anode substrate or current collector 14. The cathode and/or the anode active layer typically include a porous particulate composite including an electrode active material, a conductive additive and a polymer binder. A porous composite separator 15 separates the electrode layers. A liquid electrolyte permeates the porous separator membrane. The current collector is in contact with its respective electrode layer to permit current flow during charge and discharge cycles of the electrochemical cell. The cells may be stacked or wound together to form a prismatic or spirally wound battery. In such instances, the electrode may be coated on both sides with an electroactive layer.

As used herein, "cathode" and "positive electrode" are used interchangeably. Also as used herein, "anode" and "negative electrode" are used interchangeably.

Also, as used herein, "particle size" refers to the aggregate particle size. Aggregate particle refers to branched chains of fused primary particles. Aggregate particle size refers to the average maximum dimension of the aggregate particles and not the primary particles making up the aggregate particle. Aggregates are further distinguished from agglomerates, which are loose associations of aggregates that can be readily dispersed.

By "nanoscale," it is meant less than 500 nm, and preferably less than 100 nm.

The cathode layer 11 may be a porous composite particulate layer. The cathode active material may be a conventional cathode active material for a lithium ion secondary battery, such as a lithium-transition metal-phosphate compound, $LiCoO_2$, $LiNiO_2$ or $LiMn_2O_4$ and, the like. The lithium-transition metal-phosphate compound may be optionally doped with a metal, metalloid, or halogen. The positive electroactive material can be an olivine structure compound $LiMPO_4$, where M is one or more of V, Cr, Mn, Fe, Co, and Ni, in which the compound is optionally doped at the Li, M or O-sites. Deficiencies at the Li-site are compensated by the addition of a metal or metalloid, and deficiencies at the O-site are compensated by the addition of a halogen.

The positive electrode containing the positive electroactive material has a specific surface area of the electrode measured using the nitrogen adsorption Brunauer-Emmett-Teller (BET) method after the densification or calendaring step that is greater than 10 $m^2/g$ or greater than 20 $m^2/g$. In some embodiments the cathode active material includes a powder or particulates with a specific surface area of greater than 10 $m^2/g$, or greater than 15 $m^2/g$, or greater than 20 $m^2/g$, or even greater than 30 $m^2/g$. A positive electrode can have a thickness of less than 125 µm, e.g., between about 50 µm to 125 µm, or between about 80 µm to 100 µm on each side of the current collector, and a pore volume fraction between about 40 and 70 vol. %. The active material is typically loaded at about 10-20 $mg/cm^2$, and typically about 11-15 $mg/cm^2$.

The anode layer 13 may also be a porous composite particulate layer. In one embodiment, the negative active material is a carbonaceous material or a lithium intercalation compound. An example here would be lithium titanate as used in FIGS. 5 and 6. The carbonaceous material may be non-graphitic or graphitic. A graphitized natural or synthetic carbon can serve as the negative active material. Although non-graphitic carbon materials or graphite carbon materials may be employed, graphitic materials, such as natural graphite, spheroidal natural graphite, mesocarbon microbeads and carbon fibers, such as mesophase carbon fibers, are preferably used. The carbonaceous material has a numerical particle size (measured by a laser scattering method) that is smaller than about 25 µm, or smaller than about 15 µm, or smaller than about 10 µm, or even less than or equal to about 6 µm.

In some embodiments, the negative active material consists of powder or particulates with a specific surface area measured using the nitrogen adsorption Brunauer-Emmett-Teller (BET) method to be greater than about 2 $m^2/g$, or 4 $m^2/g$, or even about 6 $m^2/g$. The negative electrode can have a thickness of less than 75 µm, e.g., between about 20 µm to 65 µm, or between about 40 µm to 55 µm on both sides of the current collector, and a pore volume fraction between about 20 and 40 vol. %. The active material is typically loaded at about 5-20 $mg/cm^2$, or about 4-5 $mg/cm^2$.

The electroactive material, conductive additive and binder are combined to provide a porous composite electrode layer that permits rapid lithium diffusion throughout the layer. The conductive additive such as carbon or a metallic phase is included in order to improve its electrochemical stability, reversible storage capacity, or rate capability. Exemplary conductive additives include carbon black, acetylene black, vapor grown carbon fiber ("VGCF") and fullerenic carbon nanotubes. Conductive additives are present in a range of about 1%-5% by weight of the total solid composition of the electrode. The binder used in the electrode may be any suitable binder used as binders for non-aqueous electrolyte cells. Exemplary materials include a polyvinylidene fluoride (PVDF)-based polymers, such as poly(vinylidene fluoride) (PVDF) and its co- and terpolymers with hexafluoroethylene, tetrafluoroethylene, chlorotrifluoroethylene, poly(vinyl fluoride), polytetraethylene (PTFE), ethylene-tetrafluoroethylene copolymers (ETFE), polybutadiene, cyanoethyl cellulose, carboxymethyl cellulose and its blends with styrene-butadiene rubber, polyacrylonitrile, ethylene propylene diene terpolymers (EPDM), styrene-butadiene rubbers (SBR), polyimides, ethylene-vinyl acetate copolymers.

The cathode and/or anode electrode layers can be manufactured by applying a semi-liquid paste containing the appropriate electroactive compound and conductive additive homogeneously dispersed in a solution of a polymer binder in an appropriate casting solvent to both sides of a current collector foil or grid and drying the applied positive electrode composition. A metallic substrate such as aluminum foil or expanded metal grid is used as the current collector. To improve the adhesion of the active layer to the current collector, an adhesion layer, e.g., thin carbon polymer intercoating, may be applied. The dried layers are calendared to provide layers of uniform thickness and density.

Separator membrane 15 is a porous composite material including inorganic filler (or ceramic) particles and polymer. The separator is formed from a highly uniform distribution of inorganic filler material and polymer, that is, there is no discernible unevenness in the distribution of polymer and an inorganic filler material throughout the membrane. There are substantially no regions of the membrane having discernible regions of predominantly polymer or ceramic material. This highly uniform distribution is observable even under high magnifications typical of SEM microscopy. The separation materials should be electronically insulation when used in an electrochemical cell.

A separator membrane for an electrochemical cell may be formed directly onto an electrode by utilizing a coating solution comprised of a polymer, a solvent system for the polymer and a ceramic material dispersed in the solvent. Application of the separator membrane components from a solution onto the electrode layer provides a durable bond between the two layers. The separator precursor solution is coated onto a surface of an electrode so as to form a liquid layer. The solvent is removed from this layer leaving a porous solid body comprised of the polymer and the ceramic material. Finally this polymer is cured by heating for a period of time to a temperature greater than the polymer melt temperature ($T_m$) or glass transition temperature ($T_g$). As a result, the separator membrane is directly bonded to the surface of the electrode, so that the membrane has unusually good adhesion to the electrode active layer. This excellent adhesion improves performance by reducing interfacial resistance between the electrodes and the separator membrane.

Improved adhesion may arise from the solubility of the electrode binder in the solvent system used for putting down the porous separator membrane. The solvent solubilizes the binder of the underlying electrode layer so that the binder swells and mixes with the deposited porous composite. In other embodiments, the polymer in the porous composite can anneal at elevated temperatures, which can lead to the melting and fusing of the polymer content of the separator membrane layer with the underlying electrode layer. The adhesion of the separator membrane to the adjacent porous composite electrode layer in this manner can be referred to as "solvent welding." In solvent welding, a solvent common to the binders in both the electroactive and separator membrane layers dissolve the polymers, causing them to co-mingle in solution. Upon solvent removal, the polymers are redeposited to bond more effectively the particles from both layers. In other embodiments, the binders experience melting or softening in a similar temperature regime, so that the two polymer binders co-mingle by softening rather than dissolving.

The separator membrane can be applied to any substrate. It can be applied at the desired total thickness to one electrode, or both the anode and the cathode may be coated with a porous composite layer, of the same or different composition and thicknesses. The separator membrane can have a thickness in the range of 2-40 μm. In those instances where both the cathode and anode are coated with a porous composite layer, the amount deposited from each layer can be reduced. For example, where it is desired to form a composite separator of about 20 μm, both the cathode and the anode can be coated to form a layer thickness that is substantially half the desired amount. It is desirable to have the separator layer to be as thin as possible, as this increases ionic conductivity and increases capacity in the cell. In order to improve conductivity, the porosity of the cell is desirably high. However, porosity should not result at the expense of mechanical strength. Composites that have uniform, interconnected porosity on a nanoscale, e.g., less than about 500 nm, can provide both ionic conductivity and mechanical strength.

In some embodiments the ceramic particles have a specific surface area of greater than 50-200 m²/g. In one or more embodiments, the ceramic particles have a substantially uniform particle size, e.g., are monodisperse, and the particle size is less than 1 μm. In one or more embodiments, the particle size is in the range of about 10 nm-500 nm, or 10 nm-200 nm, or about 10-20 nm.

In one or more embodiments, the organic particles form a continuous layer in combination with the polymer to provide a monomodal pore size distribution. The polymer binds together the free flowing separate particles of inorganic material and the particles are distributed well in the polymer. The polymer appears to be mixed intimately with the inorganic component to create a continuous structure. In one or more embodiments, the polymer forms a substantially continuous coating around the ceramic particles, resulting in a structure which appears to have one primary building block (no phase or materials separation), rather than regions of inorganic particulate and regions of polymer, when observed at high resolution, for example with an SEM. The pore size is in the range of about 5 nm-500 nm. The total pore volume is sufficient to provide the desired level of ionic conductivity and is typically at least 25%, but can be great than 50%, or greater than 75%, and even up to 90% in some instances. Exemplary porosity measurements of compositions containing a range of fumed silica (balance PVDF) are found in Table 1.

TABLE 1

Total % Porosity vs. Composition

| % Filler (fumed silica) | Total % Porosity |
|---|---|
| 35 | 47 |
| 45 | 56 |
| 65 | 75 |

In one or more embodiments, the organic particles form a continuous layer in combination with the polymer to provide an (at least) bimodal nanoscale pore size. In one or more embodiments, the separator membrane includes a narrow pore size distribution having a value in the range of about 5-100 nm, or 5-50 nm, or 5-10 nm, and spanning a range of about 5-10 nm. This narrow pore size distribution is believed to arise from the substantially uniform packing of substantially monodisperse nanoscale ceramic particles. In one or more embodiments, the separator membrane layer includes a second, larger nanoscale pore size randomly distributed in the layer and a second smaller nanoscale pore size substantially uniformly distributed in this same layer. The larger pore sizes that are larger than the first nanoscale pore size can have a value of about 100-500 nm or about 100-200 nm, and spanning a range of about 5-25 nm.

While not wanting to be bound to any particular mode of operation, it is believed that the smaller pores arise from the formation of aggregates, e.g., tetragonal aggregates, in the coating solution slurry formation, which disrupt the otherwise uniform coating deposition of the nanoscale ceramic particles. In one or more embodiments, there may be a pore size distribution that is intermediate to the smallest and largest pore sizes. By way of example, in the intermediate pore size distribution can be in the range of about 10-400 nm.

Figure 4:
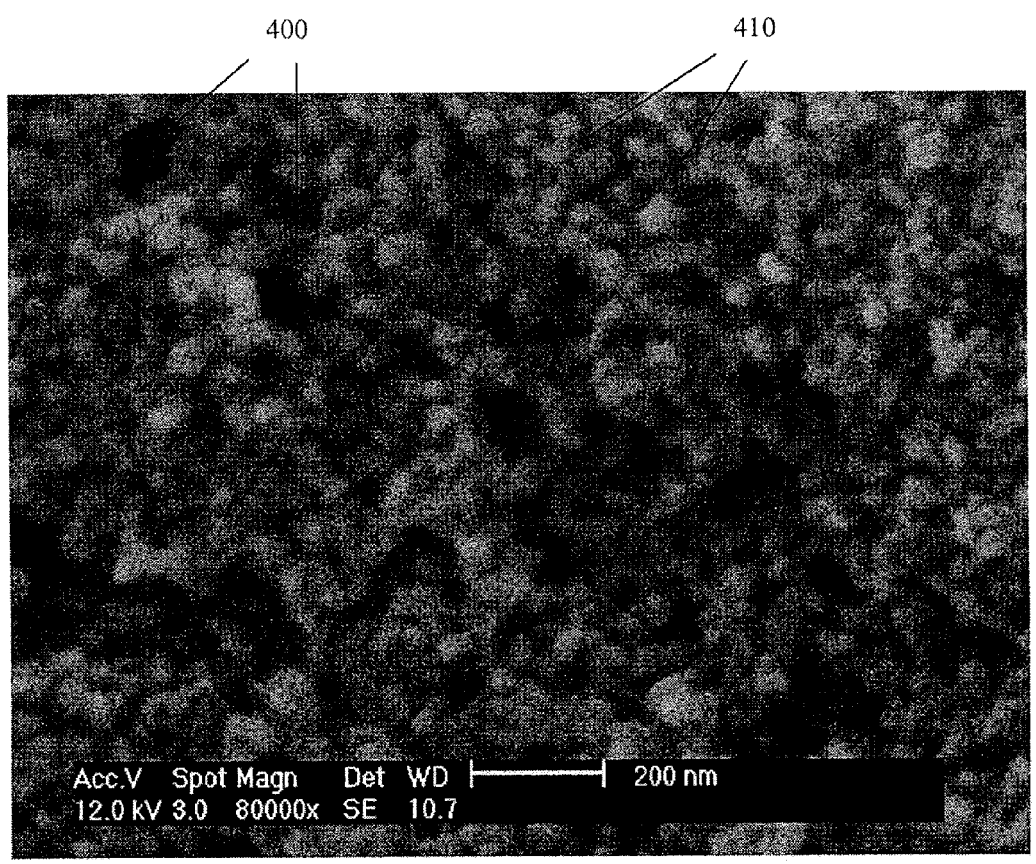
FIG. 4 is a photomicrograph of a spray coated separator film according to one or more embodiments demonstrating a pore size distribution which is both nanoscale and bimodal.

FIG. 4 is a SEM photomicrograph of a porous separator prepared according to one or more embodiments of the present invention. Under high magnification, the composite layer exhibits a pore size distribution based in a single type of polymer/inorganic primary unit as is seen in the photomicrograph in FIG. 4, which is believed to be unique. The pore size distribution appears bimodal, with relatively larger pores 400 (typically ca. 100 nm-200 nm, but less than one micron) distributed randomly throughout the layer over a background pore size 410 that is of a finer nanoporous texture (ca. 10 nm). A highly uniform mixing of polymer with ceramic particles is formed, such that distinct regions which are only polymer or only ceramic are not found, or are quite scarce. Pore size and pore size distribution may be determined using conventional methods. By way of example, pore size may be determined using thermoporometry by differential scanning calorimeter, mercury porosimetry, liquid displacement methods and gas sorption techniques. Porosimetry is a technique used to determine as pore diameter, total pore volume, surface area, and density. The technique involves the intrusion of a non-wetting liquid (often mercury) at high pressure into a material through the use of a porosimeter. The pore size can be determined based on the external pressure needed to force the liquid into a pore against the opposing force of the liquid's surface tension. This technique is used to determine the pore size of separator membranes in the examples below.

There are a number of materials which may be used in the preparation of porous separator membranes. The polymer is selected from those polymers which are compatible with the chemistry of a particular battery system. The polymer should be electrically insulating, should have low solubility in electrolyte solvents and be chemically and electrochemically stable in the cell. The polymer may be a single polymer or a mixture of polymers. Exemplary materials include a polyvinylidene fluoride (PVDF)-based polymers, such as poly(vinylidene fluoride) (PVDF) and its co- and terpolymers with hexafluoroethylene, tetrafluoroethylene, chlorotrifluoroethylene, poly(vinyl fluoride), polytetraethylene (PTFE), ethylene-tetrafluoroethylene copolymers (ETFE), polybutadiene, cyanoethyl cellulose, carboxymethyl cellulose and its blends with styrene-butadiene rubber, polyacrylonitrile, ethylene propylene diene terpolymers (EPDM), styrene-butadiene rubbers (SBR), polyimides, ethylene-vinyl acetate copolymers. One group of polymers having utility in lithium and lithium ion battery systems, as well as other battery systems, includes fluorinated polymers and latex polymers such as styrene butadiene and other styrene-based polymers. Latex polymer systems tend to form polymer suspensions and may not be solubilized in the liquid carrier. Polyvinylidene fluoride polymer compositions including polyvinylidene fluoride copolymers and terpolymers are one group of polymers having specific utility. There are a variety of such materials known and available in the art, and such materials may comprise essentially homogeneous PVDF as well as blends and copolymers. One particular material is a PVDF material sold under the trademark Kureha 7208. Other equivalent and similar materials may likewise be employed. See, for examples, the materials discussed above for the preparation of the anode and cathode active layers.

The inorganic component may be selected from a variety of natural and artificial materials that are compatible with the particular battery systems and chemistry in which the membranes are to be incorporated. Mixtures of two or more suitable inorganic components are contemplated. The inorganic component may be a ceramic material. One particular group of ceramic materials comprises silica, with fumed silica being one specific form of silica which may be employed. Fumed silica is a high surface area, generally high purity silica material. Fumed silica is generally hydrophilic and can be wetted easily by most electrolyte solvents and many polar polymers. A material which has been used in one or more embodiments has a surface area of approximately 200 $m^2/g$. The particles are very small and typically are less than 500 nm in diameter, or less than 200 nm in diameter, and more typically about 10-20 nm. In one or more embodiments, the ceramic material is fumed silica having a narrow particle size distribution and a substantially spherical shape. Fumed silica can be prepared in a carefully controlled reaction of silicon tetrachloride ($SiCl_4$) that results in a highly controllable and narrow particle size distribution. In one embodiment, a fumed silica having a particle size of about 14 nm may be employed.

Other silicon compounds may be utilized as a ceramic component of the membranes, such as for example, polyhedral oligomeric silsequioxane (POSS), which in the context of this disclosure is considered to be a ceramic material. Other ceramic materials include natural and synthetic zeolites, alumina, titania and the like. In addition, other electrochemically stable inorganic particles of appropriate size can be used, e.g., MgO, $CaCO_3$ and other metal carbonates, zirconia, silicon phosphates and silicates. The ceramic materials may be used either singly or in combination, with uniform or mixed sizes and shapes as well.

The proportions of polymer and inorganic materials may vary over a relatively wide range. In some instances, the ratio of ceramic to polymer may range, on a weight basis, from 95:5 to 35:65. In some instances, the ratio of ceramic to polymer may range, on a weight basis, from 65:35 to 45:55. In one specific instance, the membrane will comprise, on a weight basis, approximately 65% fumed silica and 35% PVDF. In one or more embodiments, the solids load of the coating solution is about 1 wt % to about 20 wt %, or about 3 wt % to about 10 wt %.

The presence of a significant amount of organic polymer component is distinguishable from prior art compositions, which are even more predominantly inorganic (>90:10) and which typically use significantly larger particle size ceramic materials. Without being bound to any particular mode of operation, it is hypothesized that the polymer organic provides flexibility and mechanical strength, without impeding the porosity provided by the packing of the substantially spherical particles of the inorganic filler material. Higher polymer levels also promote the fusion bonding of adjacent porous layers in an electrochemical cell prepared using the porous separator membrane.

The solvent system used in the preparation of the coating solution may comprise any solvent system in which at least one component of the coating solution is capable of dissolving the polymer component. Suitable second or further components may be used; if not capable of dissolving the polymer, the additional components are highly miscible with the first solvent. Preferably, the solvents are relatively easy to remove during subsequent processing steps. One solvent which has been found to have utility in connection with PVDF-based membranes includes N-methylpyrrolidinone (NMP), and the NMP may be blended with another solvent such as acetone, ethyl acetate, and propyl acetate for example, to obtain the appropriate slurry rheology. By way of example, solvents of different boiling points may be used to control solvent evaporation rates and thus film stresses which are generated during drying of the liquid slurry. One specific solvent mixture which was utilized in one implementation of the present invention comprised, on a volume basis, a 30:70 NMP/acetone mixture. Others include 30% NMP with 70% of propyl acetate, methyl ethyl ketone (MEK), or ethyl acetate. The composite slurry is a relatively homogeneous suspension which is relatively stable in the absence of shear.

In one or more embodiments, the solvent system is selected to provide robust adherence of the separator membrane to adjacent electrode layer(s) without undesirable delamination of the electrode layer from the current collector. When the electrode layer is deposited, the surface of the current collector may be treated to promote electrode adhesion. In addition, the polymer binder promotes adhesion of the electrode particles to the current collector surface. However, if the solvating properties of the solvent system used to cast the separator membrane are too strong or the permeability of the solvent system into the electrode layer is too high, it may completely or significantly dissolve the binder of the electrode layer and thereby delaminate the electrode layer from the current collector. The effects of delamination can be quite dramatic and it can render the electrode/separator membrane assembly unusable.

Thus, according to one or more embodiments, the solvent system is selected to provide limited solubility of the binder in the electrode layer. This may be accomplished by appropriate selection of the polymer and solvent system in the casting solution for the separator membrane so that the solvent system has good solubility for the separator polymer, but lesser solubility for the binder of the electrode layer. In one or more embodiments this may be achieved by providing a solvent system that limits the amount of solvent present that would solubilize the electrode binder. By way of example, the solvent is blended with a second solvent having lower solubility for the binder. In one or more embodiments, less than 50 vol %, or less than 30 vol %, of the solvent system is a binder soluble solvent.

In other embodiments, the same polymer is used for the electrode and the separator layers. That means that the solvent has the same solubilizing effect on both materials. The solvent system can be adjusted in other ways to prevent delamination of the electrode layer from the electrode. In other embodiments, the viscosity of the solvent system is adjusted to prevent or reduce the level of penetration of the casting solution into the electrode layer. In one or more embodiments, the casting solution remains at the interface with electrode layer and does not penetrate substantially into the electrode layer. By way of example, it does not penetrate more than 90%, or more than 75%, or more that 50% or more than 25% or more than 10% of the thickness of the electrode layer.

Methods of controlling solution viscosity (and thereby solution penetration) include controlling the solids content of the coating solution. When working with a comma coater, a type of roll coating, low solids content coating solutions can lead to delamination. By increasing the percent solids, and thus the viscosity, delamination can be prevented. For an exemplary fumed silica/PVDF/NMP/acetone system as described herein, 5.5% solids lead to delamination, 8% solids had less delamination, whereas 9% solids had no delamination.

The viscosity of the casting solution can also be adjusted by selection of solvents of differing viscosities.

When working with a spray coating system it may not be possible to increase viscosity to a level that would prevent penetration since the ability to spray a quality mist is related to the viscosity. One solution is to reduce the amount of liquid deposited in any given time, since for a given slurry formulation the more liquid that is deposited, the more likely it is to cause delamination. To address delamination in a spray coating system, the number of passes between drying steps is adjusted. In one or more embodiments, multipass deposition of thin layers of the coating solution is employed to reduce delamination.

The inorganic material and polymer are combined in the solvent system to form a uniform distribution of inorganic particles in the dissolved polymer/solvent system. The highly uniform distribution of polymer and inorganic material in the coating solution provides a highly uniform distribution of polymer and inorganic materials in the resultant membrane. By blending a poorer solvent into the strong solvent in the coating solution, a suspension of polymer and inorganic filler is created. This suspension helps assure an intimate mixture of the two solids and prevents particulate separation/segregation during the drying step. FIG. 4 is a scanning electron microphotograph (SEM) of a separator according to one or more embodiments that illustrates the uniform distribution of organic polymer and particulate inorganic components.

Figure 2:
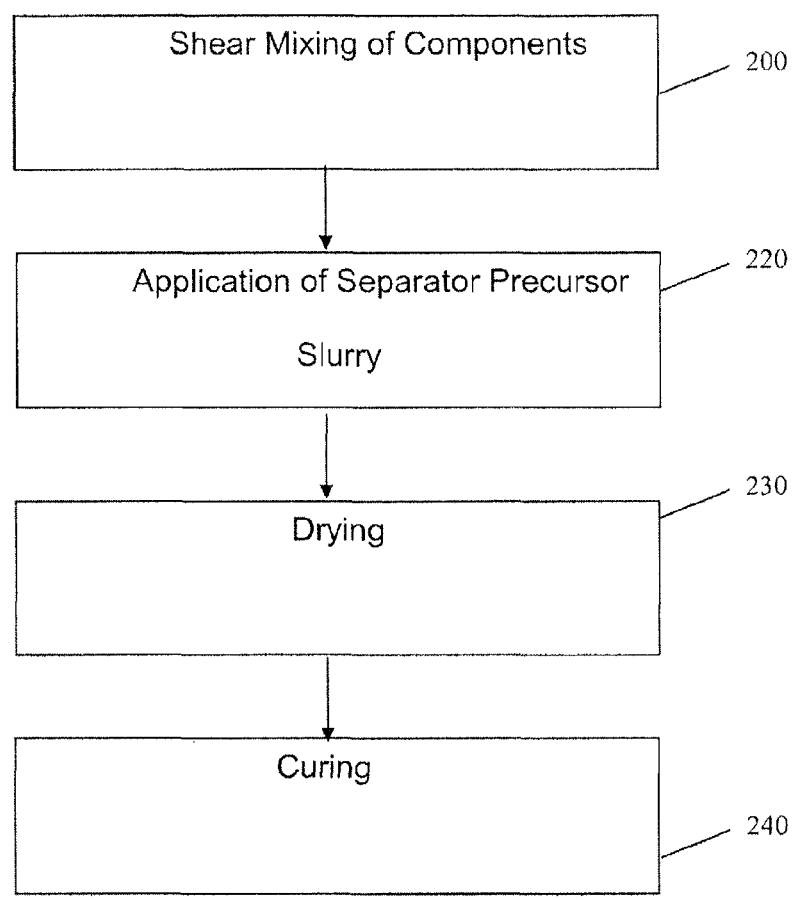
FIG. 2 is a flow diagram of the spray coating process used in one or more embodiments to prepare a separator membrane.

A coating method is described with reference to FIG. 2. In step 200, the coating solution is prepared including a solvent, solvent-soluble or solvent-miscible polymer and inorganic particles. In one or more embodiments, the polymer, liquid solvents and inorganic ingredients are mixed under low shear for an initial period until ingredients are fully wetted and/or dissolved. In a preferred method the polymer and inorganic are first mixed in NMP so that a high level of dispersion is achieved. Next, the second solvent is added, and this mixture can then be subjected to a high shear mixture until a desired rheology is obtained. A desirable slurry does not contain large agglomerates and does not quickly phase segregate to separate regions of polymer and inorganic materials upon standing but instead remains well dispersed. Without being bound by any mode or theory of operation, it is believed that the solution rheology provides an indication of distribution of particle sizes and agglomeration behavior as well as total particle concentrations. More complex and asymmetric shapes and a larger number of particles tend to increase the viscosity of a solution. Such slurry properties may play a role in the final structure of the layer.

The coating solution is then coated onto at least one surface of an electrode material, as is indicated in step 220. The thickness of the layer coated onto the electrode will depend upon the particular composition of the coating solution and the final thickness desired in the electrochemical cell. Other coating techniques may be employed according to one or more embodiments of the invention, so long as they are susceptible to depositing a composition including a mixed ceramic and particle composition. Exemplary techniques includes doctor blading, roll coating, slot die coating, ink jet printing, spin coating, gravure coating and screen printing, or other coating methods. Coating is typically carried out under conditions that provide for solvent welding between the separator membrane layer and the adjacent electrode layer.

In one or more embodiments, coating may be accomplished by spraying one or more coats of the applicator coating solution thereonto. By way of example, the separator layer may be applied in about 3 to 5 coating steps, each coating step applying about ⅓ to ⅕ of the total separator layer thickness. As noted above, multipass deposition reduces solvent penetration into the electrode porous layer and can help reduce delamination. It has been surprisingly found that the application of the separator layer in multiple steps significantly reduces the number of defects formed in the final layer. Defects are defined as large pores having dimensions greater than one micron, or cracks in the film. The depositions steps need not apply layers of similar thickness. Thus, a first coating step can deposit a layer of a first thickness and a second step can deposit a layer of a second, different thickness.

Following the coating, step 230 illustrates that the solvent is removed from the coating mixture to leave a solid porous body of polymer/ceramic particles on the electrode. The solvent may be removed by evaporation, and this evaporation may be fostered by use of heating and/or low pressure conditions. In some instances, the solvent may be extracted by the use of an extraction solvent which is a non-solvent for the polymer. Such techniques are known in the art. In one or more embodiments, the solvent optionally may be removed after each spray coating step, so that multiple solvent removal steps may be conducted when multiple spray coating steps are used.

In one or more embodiments, the polymer is a thermoplastic and has a glass transition temperature ($T_g$) and may or may not have a melt temperature ($T_m$). In one or more embodiments, after coating a coating onto the support, the layer is subjected to a treatment selected to reduce the stress in the layer by curing the layer. The polymers may be cured by treatment above their glass transition or melting temperature so as to modify or enhance its physical properties (step 240). Curing may be accomplished by heating, as is known in the art. The drying step and the curing step may or may not be carried out in serial steps. In the case of thermoplastic polymers, such as PVDF, curing is accomplished by heating the composite beyond the host polymer $T_m$ and then allowing it to cool down. In other embodiments, the layer is heated at or above the glass transition temperature of the polymer binder.

Figure 3:
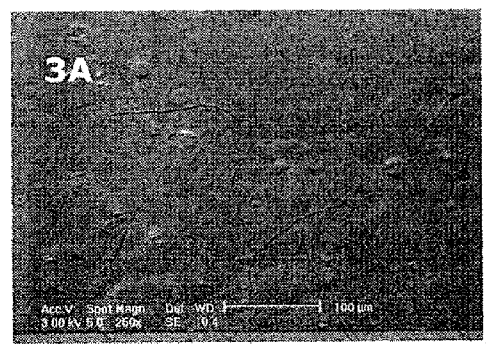
FIGS. 3A-C are photomicrographs of porous separator coatings of several thicknesses that have been prepared by single or multiple pass spray coating methods.
Figure 3:
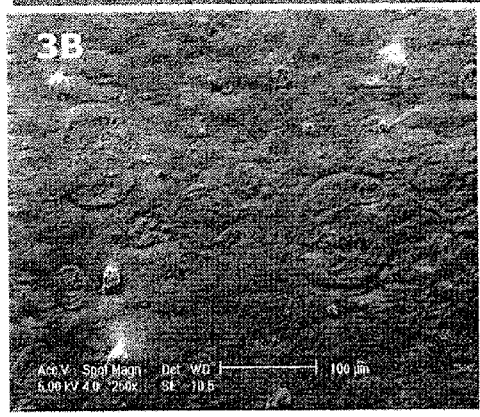
Figure 3:
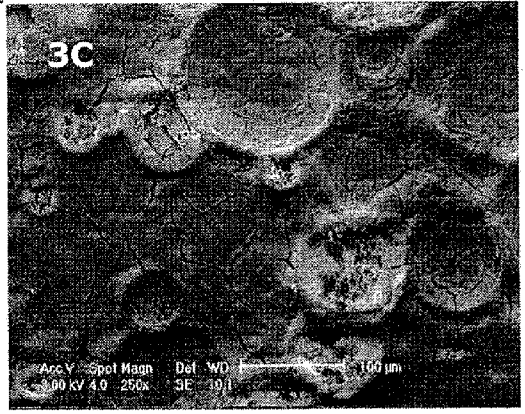

It is believed that the multistep coating approach leads to fewer large cracks in the separator film. While not being bound by any particular mode or theory of operation, the second coating may fill the crevices created in the initial coating to heal any defects of cracks. The advantages of the multistep coating method are illustrated by comparison of fumed silica/PVDF coatings that have been prepared using a single vs. multiple coatings. Photomicrographs of porous separator coatings of varying thicknesses that have been prepared by single or multiple pass spray coating methods are shown (FIGS. 3A, 3B, 3C). The layers were dried using the same heating/curing method of drying at 80° C. under vacuum followed by curing at 200° C. for 15 min. The film shown in FIG. 3A is 5 μm thick and deposited in a single step; the film shown in FIG. 3B is 17 μm thick and deposited in three steps; and the film shown in FIG. 3C is 13 μm thick and deposited in a single step Only, the film in FIG. 3B that was deposited using three passes is without cracks, even under high magnification. Cracking has been shown to reduce the performance of the electrochemical cell. See, Example 7.

The result of the foregoing process is the deposition onto an electrode (or other suitable substrate) of a layer of separator layer comprised of polymer and ceramic particulate material that are intimately combined and nanoporous. The process can be used to apply a porous separator membrane onto a supporting substrate such as an electrode. These membrane coatings have been found to be durable and highly adherent. The membrane coated electrode may then be incorporated into battery cells, and the cell may include coatings on either or both of the anode and cathode electrodes. The electrode can be processed into a battery, e.g., by assembly the current collector, positive electrode, separator membrane, negative electrode and current collector layers into a laminate structure and then bending or rolling the laminate structure into the appropriate form. In one or more embodiments, a nonaqueous electrolyte is used and includes an appropriate lithium salt dissolved in a nonaqueous solvent. The electrolyte may be infused into a porous separator that spaces apart the positive and negative electrodes. In one or more embodiments, a microporous electronically insulating separator is used.

Numerous organic solvents have been proposed as the components of Li-ion battery electrolytes, notably a family of cyclic carbonate esters such as ethylene carbonate, propylene carbonate, butylene carbonate, and their chlorinated or fluorinated derivatives, and a family of acyclic dialkyl carbonate esters, such as dimethyl carbonate, diethyl carbonate, ethylmethyl carbonate, dipropyl carbonate, methyl propyl carbonate, ethyl propyl carbonate, dibutyl carbonate, butylmethyl carbonate, butylethyl carbonate and butylpropyl carbonate. Other solvents proposed as components of Li-ion battery electrolyte solutions include γ-BL, dimethoxyethane, tetrahydrofuran, 2-methyl tetrahydrofuran, 1,3-dioxolane, 4-methyl-1,3-dioxolane, diethyl ether, sulfolane, methylsulfolane, acetonitrile, propiononitrile, ethyl acetate, methyl propionate, ethyl propionate and the like. These nonaqueous solvents are typically used as multicomponent mixtures.

A solid or gel electrolyte may also be employed. The electrolyte may be an inorganic solid electrolyte, e.g., LiN or LiI, or a high molecular weight solid electrolyte, such as a gel, provided that the materials exhibit lithium conductivity. Exemplary high molecular weight compounds include poly (ethylene oxide), poly(methacrylate) ester based compounds, or an acrylate-based polymer, and the like.

As the lithium salt, at least one compound from among $LiClO_4$, $LiPF_6$, $LiBF_4$, $LiSO_3CF_3$, $LiN(SO_2CF_3)_2$, $LiN(SO_2CF_2CF_3)_2$ and the like are used. The lithium salt is at a concentration from 0.5 to 1.5 M, or about 1.3 M.

In other embodiments, the process can be used to apply a porous separator membrane onto a sacrificial support, such as a polymer film. The resultant membrane can be transferred to an electrode or other element. The porous composite layer is not required to be formed directly onto the electrode, but can be formed on other surfaces. For example, the separator can also be prepared on a sacrificial support, e.g., a polymer sheet, which is used to transfer the separator onto an electrode. This transfer is done in a manner which insures excellent adhesion to the electrode substrate. Additional manufacturing steps can be avoided by applying the separator directly on the electrode surface.

In one or more embodiments, one or more cell assemblies can be combined into an integral body that has high degree of connectivity and low resistance. It has been surprisingly discovered that stacked electrode layers can be laminated under heat and pressure without significant loss of porosity, cracking or other defect formations. Conventional understanding would predict that the forces needed to fuse or laminate the electrode layers would degrade the porous layers leading to short circuiting and reduced conductivity (higher resistance).

Applicants have surprisingly discovered that robust laminated cells can be obtained without such detrimental effects. While not being bound by any particular mode or theory of operation, a higher polymer content in the porous separator may provide sufficient material resilience to allow the stacked cells to be laminated without cracking or significant densification. In one or more embodiments, the separator layer may include about 40-65 wt % polymer.

Figure 9:
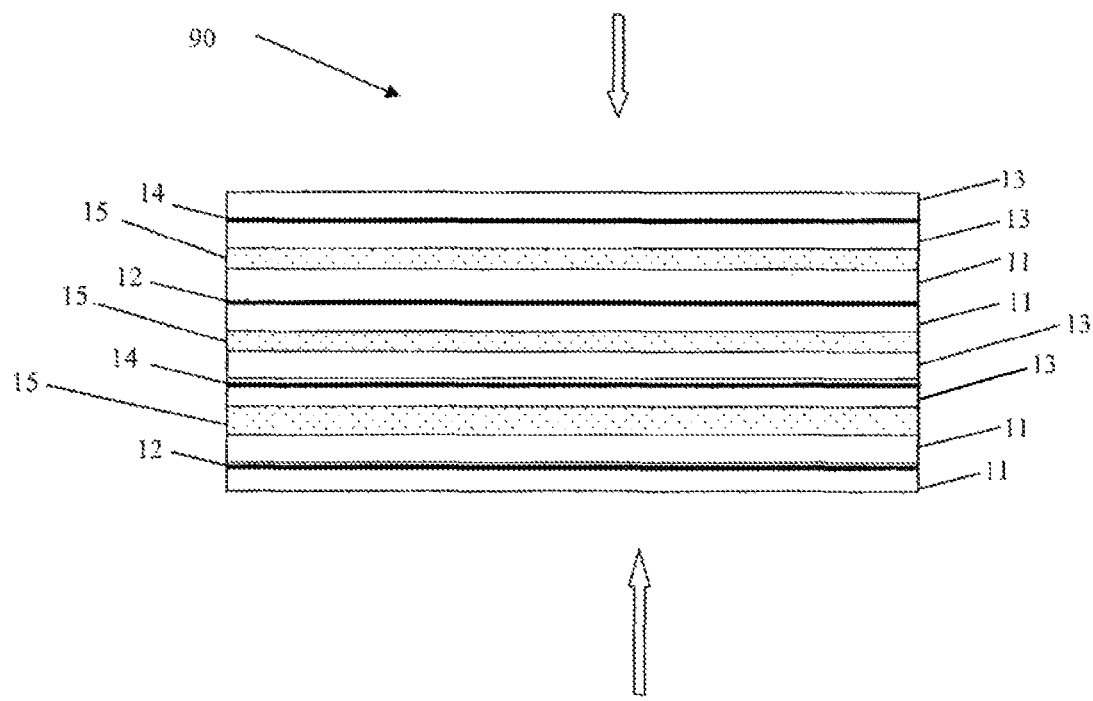
FIG. 9 is a schematic cross-sectional illustration of a stacked electrochemical cell according to one or more embodiments of the invention.

To prepare a laminate electro chemical cell, electrode-coated current collectors and separator membranes can then be stacked to provide a stacked assembly 90 as illustrated in FIG. 9, in which like elements are similarly numbered. Thus a current collector 14 having anode layers 13 on both sides can have a separator layer 15 deposited on one side as described herein. Current collector 12 having cathode layers 11 on both sides can also have a separator layer 15 deposited on one side as described herein. The stacked assembly may be reassembled using various components. The stack may include a cathode/separator membrane assembly, which can then be stacked with anode layers to form the stacked assembly. In other embodiments, an anode/separator assembly is combined with cathode layers to form the stacked assembly. In still other embodiments, cathode/separator membrane assemblies and anode/separator assemblies are used. In this case, the separator membrane layer thickness is adjusted (thinner) to accommodate the separator membrane from both the anode and cathode assemblies. Any number of cathode and anode layers may be included in the stack, although they are typically matched (or may contain an extra of either of the cathode or anode layer). In one or more embodiments, at least 2, at least 5, at least 10 or at least 20 cathode/separator/anode separator repeat units are used in the stacked cell.

The stacked assembly can be heated at or above the $T_g$ or at or above the $T_m$ of the binder and polymer of the assembly under pressure, e.g., in the direction shown by the arrows in FIG. 9. Upon cooling, the assembly is robustly laminated and has formed a single continuous monolithic cell which demonstrates significantly reduced resistivity due to the solvent welding and fusion between the composite separator layers accomplished by the laminating process. In one or more embodiments, a small amount of solvent is sprayed onto the porous separator surfaces prior to application of pressure and temperature. The additional solvent can help in the solvation and softening of the polymer/binder. The lamination is considered to be effective when peeling laminated electrodes apart reveals the metal foils, which means that the weakest link is the electrode/current collector—not the separator/separator interface.

TABLE 2A

Exemplary Laminating Conditions

| Porous separator composition (Ratio is fumed silica:PVDF) | Temperature (° C.) | Pressure (psi) | Time (min) |
|---|---|---|---|
| Dry 65:35 | 160 | 500 | 3 |
| NMP Wetted 65:35 | 140 | 500 | 3 |
| Dry 45:55 | 140 | 500 | 2 |

The laminated electrodes are electronically robust and no electrical short is formed upon lamination, as determined by a high resistance reading, e.g., >20 MΩ, between the laminated anode and cathode with a multimeter. The pores of both the porous separator and the porous electrode substrate also desirably retain their shape and or size when pressure/temperature are applied. Maintenance is estimated by measuring the thickness of the electrode stack before and after laminating. In one or more embodiments, the reduction in thickness (reduction in porosity) is less than about 10%. The reduction in thickness and resistance reading for exemplary laminated cells are shown in Table 2B.

TABLE 2B

Thickness and Resistance Measurements for Exemplary Laminated Cells

| NCS type | Cell no. | Lamination condition | % loss in thickness | Multimeter |
|---|---|---|---|---|
| 65:35 | 1 | Temp: 160° C. Press: | 8.13 | >20 MΩ |
|  | 2 | 500 psi | 8.22 | 6.4 kΩ |
|  | 3 | Time: 5 min | 7.86 | >20 MΩ |
| 45:55 | 1 | Temp: 140° C. | 5.50 | >20 MΩ |
|  | 2 | Press: 500 psi | 5.39 | >20 MΩ |
|  | 3 | Time: 3 min | 5.61 | >20 MΩ |

Table 2B illustrates cell properties for two different laminated cells having different porous separator compositions (65 wt % fumed silica vs. 45 wt % fumed silica) and obtained under different laminating conditions. As can be seen, the % loss in thickness (which correlates to densification) is very low. In addition, all of the cells had at least 20 megaohm resistance, indicating that the cells integrity is maintained and no short circuit has occurred.

Figure 11:
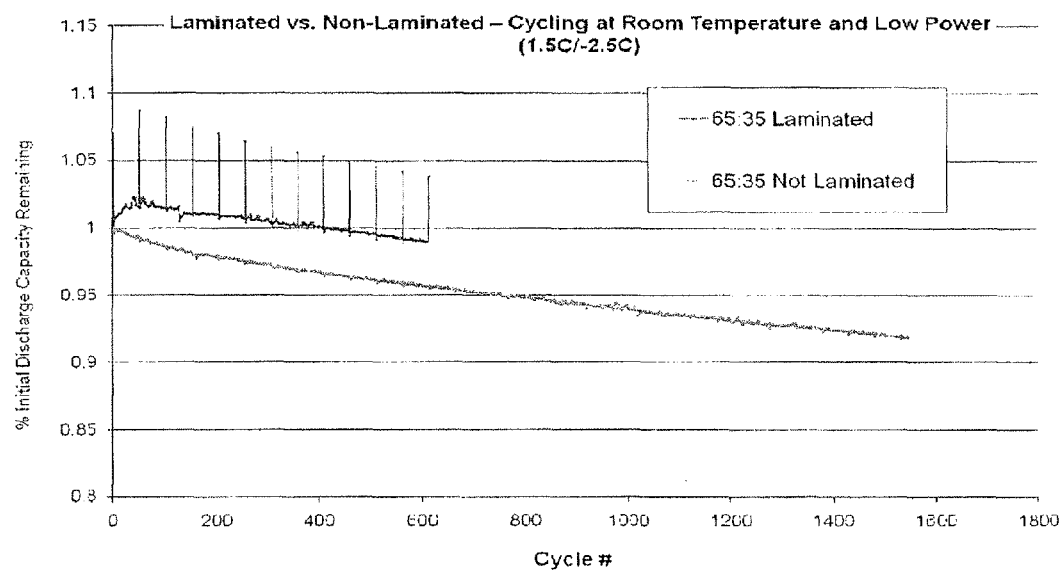
FIG. 11 is a plot of % initial discharge capacity vs. cycle for laminated and unlaminated cells.

FIG. 11 is plot of % initial discharge capacity vs. cycle number of laminated and unlaminated cells. Both cells include multiple porous separators having 65 wt % fumed silica and 35 wt % PVDF in a stacked electrode. Both curves show very little capacity loss over many cycles. In fact, the laminated cell appeared to show a slight advantage in retaining discharge capacity (the upticks in the curve can be disregarded as artifacts), indicating that the electrochemical and mechanical integrity of the cell is maintained after laminating.

A porous separator is formed having desirable mechanical, electrochemical and safety features. By way of example, an inorganic/organic composite separator according to one or more embodiments that is aggressively cycled (+10 C/−10 C) shows little Li plating on the anode of the cycled cell. In comparison, a cell made using standard separator membrane shows significant Li plating on the anode under similar conditions. Without being bound by any theory of operation, it is hypothesized that the unique nano-structure of a porous composite separator according to one or more embodiments positively influences charge distribution and mass transport thereby reducing lithium plating.

The specific properties of the membrane in terms of composition, thickness, physical properties and the like will depend upon particular battery systems in which the membranes are to be incorporated. Further illustration is provided in the following examples, which are presented for the purpose of illustration only and are not intended to be limiting of the invention.

Example 1. Preparation of a Porous Separator

Membranes for lithium-ion cells were prepared from a 65:35 mixture of fumed silica and PVDF. Membranes were prepared from Kureha 7208 PVDF NMP solution and fumed silica with a surface area of approximately 200 m²/g. The ratio of silica to polymer was 65:35 on a weight basis, and a 7% loading of these solids was slurried in a 30:70 (volume/volume) mixture of NMP and acetone. This slurry was prepared by first thoroughly mixing the silica into the PVDF/NMP solution using an orbital mixer at a low speed until highly dispersed, and then slowly adding the acetone to this dispersion mixing first at low speed and then at very high speeds until a stable suspension is formed. This is then loaded into a HVLP spray gun.

This coating composition was applied to either a body of anode or cathode material intended for use in a lithium-ion cell. The dry thickness of the application was approximately 20 microns and it was applied in 3 to 5 separate coats, with drying at 80° C. in vacuum between each coating. For example, to create a 20 μm separator using three separate coating steps, each having an equal dry thicknesses of approximately 7 microns, the electrodes were sprayed three times so that a wet thickness of ~100 μm was deposited. (Evaporation of the solvents during the drying process reduced the thickness of each layer from 100 μm to ~7 μm.)

After each coating, the electrode was vacuum dried at 80° C. for 1 hour and then finally cured at 200° C. for 15-60 minutes in air at ambient pressure after the last coating is applied. The resulting electrode/separator membrane structures were employed in a variety of cell architectures including coin cells, pouch cells, and stacked prismatic cells.

These coated electrodes were found to function very well. In particular, 350 mAh prismatic cells incorporating the foregoing separator were shown to function very well in both limited cycle life performance tests compared to cells using conventional membrane separators Cells utilizing the foregoing separators show comparable cycle life relative to conventional membrane separator cells. In smaller capacity laboratory cells incorporating the foregoing separator it was observed that substantially higher power could be obtained than in similar cells made incorporating a conventional membrane separator.

Example 2. Measurement of Leakage Current

Leakage current is a figure of merit in predicting cell shelf-life.

A porous membrane prepared substantially as described in Example 1 was prepared with the following modifications. The silica separator was laid down in either one or two passes onto a lithium iron phosphate based cathode. In the former, the process protocol is to spray, dry, and then cure the layer. If the latter, then the protocol is to follow the spray/dry/spray/dry/cure technique.

Cells were prepared with Li metal anodes in a single layer pouch format by placing the coated cathode made of a lithium iron phosphate material (LFP) directly adjacent to a counter electrode of Li metal in a pouch container that is sealed on three sides, filling the cell with electrolyte and then sealing the fourth side so that the interior is totally isolated from the external environment. The cells were cycled three times (+C/2, −C/5) before being charged to 3.0V and left at open circuit. The current was monitored for three days and then extrapolated to full discharge to give the values seen here. Table 3 shows the leakage current measured for a variety of cell types in which the total separator thickness and number of coatings were varied. The average leakage current (and resultant time to discharge) were lower (and longer) for cells in which the porous silica layer was deposited in two steps. The leakage current for sprayed-on silica membranes were comparable to comparison cells made with commercially available Celgard 2325 and Gore Excellerator separators. While comparison cells demonstrated longer time to discharge than any of the test cells 2A-2D, test cells 2A and 2B demonstrated lower average leakage currents (0.97 to vs. 1.09-1.26 µA).

Example 3. Evaluation of Cell Life Cycle

Cell power is an important figure of merit. The impact of separator choice on cell power is estimated by comparing cells which are the same with exception of separator—this has been done using a pouch cell including a cathode comprising a lithium iron phosphate containing electroactive material ("M1") and an anode comprising a lithium titanate ("LTO").

A porous membrane prepared substantially as described in Example 1 was prepared with the following modifications. The silica separator was prepared as follows, electrodes (2 cm×2 cm) of M1 and LTO were each coated with about 2-5 coats of silica separator as previously described. These electrodes were then placed in a polymeric pouch, flooded with mixed carbonate/LiPF$_6$ electrolyte appropriate for a lithium ion battery and sealed to the outside environment. Similarly, 2 cm×2 cm electrodes of LTO and M1 were prepared and sealed into a similar pouch separated by a polyolefin membrane. In all respects, save the separator, these two cells are identical.

Cells were prepared with LTO anodes in a single layer pouch format substantially as described in Example 2.

Figure 5:
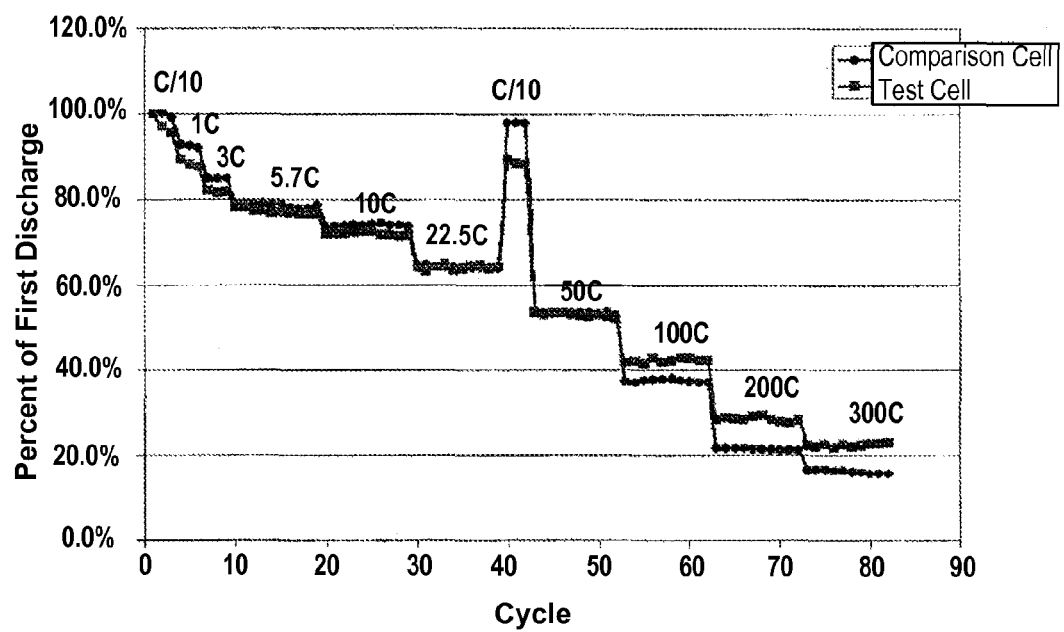
FIG. 5 is a plot of % first discharge at different discharge rates (C/10-300 C) for full discharge of a test sample and a comparison sample using a pouch cell having either the composite separator coating or a free standing separator film, wherein this separator film is specially designed at high cost for high power, according to one or more embodiments of the invention.

Comparison cells were prepared as described above, except that the separator was a porous polyfluorinated polymer membrane available from Gore, Inc. under the trade name Gore Excellerator having a thickness of approximately 23 µm The cells were cycled through charge/discharge cycles at increasing charge rates (1/10C, 1 C, 3 C, 5.7, 10 C, 1/10 C, 5 C, 100 C, 200 C and 300 C). Cycling at each charge rate was carried out for about 3-10 cycles. The cell performance was monitored by plotting the percent of first discharge at each cycle for both the test cell and the comparison cell. As is shown in FIG. 5, the test cell using the polymer ceramic having a nanocomposite separator performed as well as the comparison cell having a Gore Excellerator separator up to 50 C and then exceeded cell performance of conventional standard separator at charge rates above 50 C.

Example 4. Evaluation of Cell Life Cycle

Cell life cycle performance for a prismatic cell was investigated. Power value is estimated by comparing cells

TABLE 3

Leakage Current for a variety of separator types and manufacturers in LFP half cells and LFP/LTO cells

| Cell | (+) | (−) | Separator | Total thickness (µ) | Number of applications to achieve thickness | Average Leakage Current (µA) | Time to discharge cell, (hours) |
|---|---|---|---|---|---|---|---|
| 2A | LFP | Li | Aldrich Si-PVDF(65:35) | 34 | 2 | 0.93 | 4334 |
| 2B | LFP | Li | Aldrich Si-PVDF (65:35) | 41 | 2 | 1.02 | 3733 |
| Avg. | | | | | | 0.97 | 4033 |
| 2C | LFP | Li | Aldrich Si-PVDF (65:35) | 22 | 1 | 37.46 | 122 |
| 2D | LFP | Li | Aldrich Si-PVDF (65:35) | 27 | 1 | 16.87 | 279 |
| Avg. | LFP | Li | | | | 27.17 | 201 |
| Avg. Comparison | LFP | Li | | 384.94 | 1780 | 1.26 | 3981 |
| 2E | LFP | Li | Gore excellerator | 30 | NA | 1.26 | 3981 |
| 2F | LFP | Li | Gore excellerator | 30 | NA | 1.03 | 4842 |
| Avg. | | | | | | 1.14 | 4412 |
| 2G | LFP | Li | Celgard 2325 | 25 | NA | 1.13 | 4354 |
| 2H | LFP | Li | Celgard 2325 | 25 | NA | 1.05 | 4767 |
| Avg. | | | | | | 1.09 | 4560 | which are the same with exception of separator—this has been done with prismatic cells.

Cells were prepared with LTO anodes in a prismatic cell format by alternately stacking about 13 anodes with about 12 cathodes. Those cells constructed using the nanocomposite separator were made with the electrodes in direct contact with each other and a layer of polyolefin membrane wrapped around the entire stack before being impregnated with electrolyte and vacuum sealed in a pouch and run through a formation process. After the formation cycles, the pouch was vented, resealed and tested. In the case of the polyolefin separated cell, the anode and cathode was separated from one another by accordion folding the membrane around the two electrodes. In all other respects the two cells were prepared identically.

Comparison cells were prepared as described above, except that the separator was a porous polyfluorinated polymer membrane available from Gore, Inc. under the trade name Gore Excellerator having a thickness of approximately 23 μm.

Figure 6:
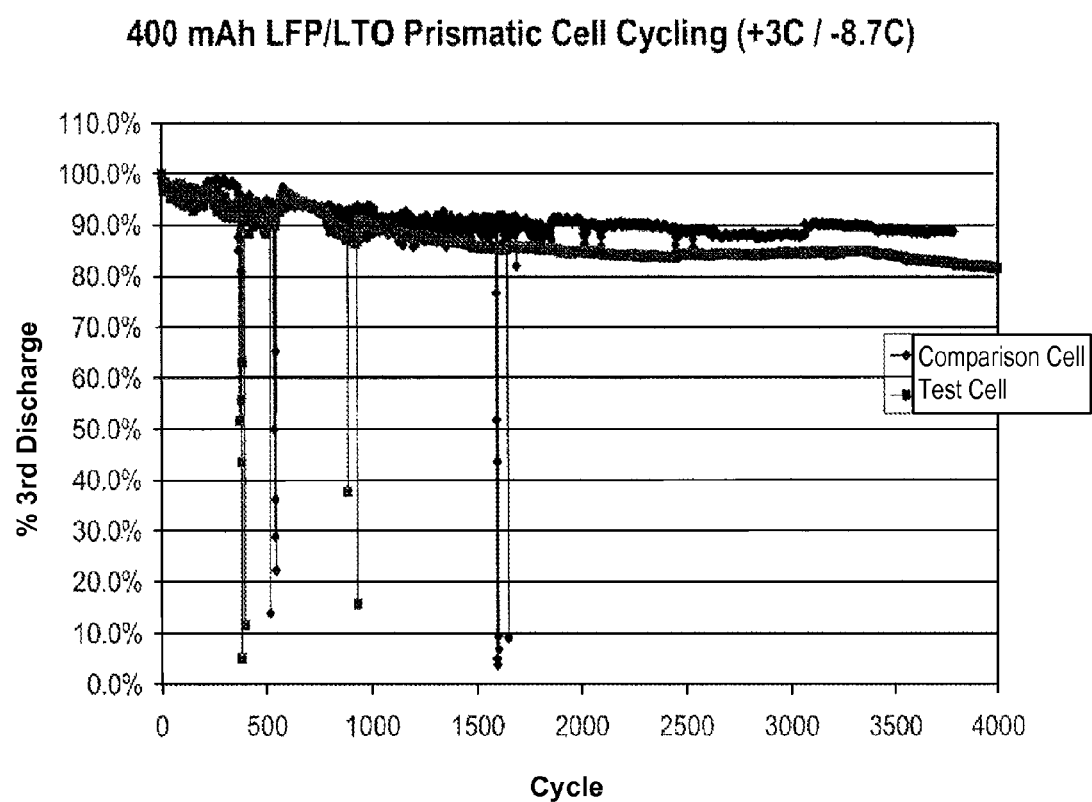
FIG. 6 is a plot of % third discharge vs. cycle at high charge and discharge rates for a test sample and a comparison sample using a prismatic cell according to one or more embodiments of the invention.

The cells were cycled through charge/discharge cycles at +3 C/−8.7 C for up to 4000 cycles and cell performance was monitored by plotting the percent of third discharge at each cycle for both the test cell and the comparison cell. As is shown in FIG. 6, the test cell performed as well as the comparison cell.

Example 5. Evaluation of Cell Life Cycle

Power is estimated by comparing the capacity vs. rate for cells which are the same with exception of separator—this has been done with pouch cells having a graphite anode.

A porous membrane prepared substantially as described in Example 1 was prepared using the method in which final thickness is achieved by three separate spray coat/dry steps.

Cells were prepared with graphite anodes in a single layer pouch format substantially as described in Example 2 with the exception that a graphite composite anode was used instead of an LTO composite anode.

Comparison pouch cells (Comparison Cell #1) were prepared as described above, except that the separator was a porous polymer membrane available from Celgard Corporation under the trademark Celgard 2320. The separator was made from porous polyolefins and had a thickness of approximately 20 microns. Another comparison cell (Comparison Cell #2) was prepared using a porous separator available from Degussa, Inc. under the trade name Separion S240P25 having a thickness of approximately 25 μm.

Figure 7:
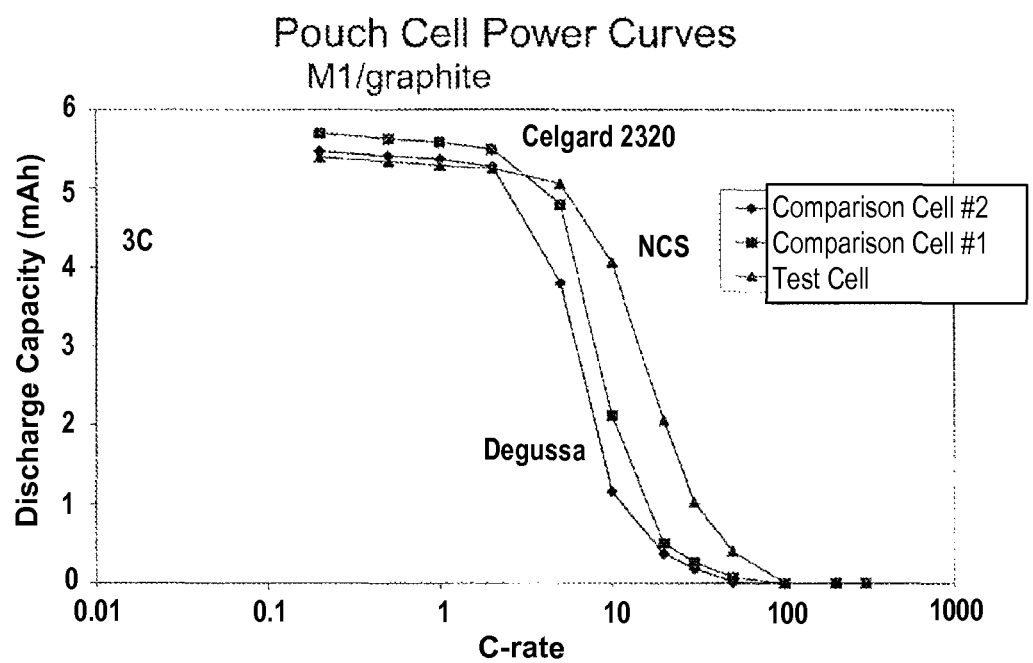
FIG. 7 is a plot of discharge capacity (mAh) vs. discharge C-rate for pouch test cells and comparison cells having commercially available separator membranes.

The cells were cycled through charge/discharge cycles at increasing discharge rates (0.1 C-500 C) and each charge rate was carried out for about 3-10 cycles. The cell performance was monitored by plotting discharge capacity (mAh), discharge C-rate for both the test cell and the comparison cells. As is shown in FIG. 7, the test cell performed as well as the comparison cells over a range of discharge rates.

Example 6. Determination of Pore Size Distribution

Pore size distribution was obtained using mercury intrusion analysis. The samples were uncoated cathode, cathode coated with separator of 65-wt % fumed silica, and cathode coated with 45-wt % fumed silica. The material for analysis was obtained by removing it from the current collector by carefully bending the samples over a razor blade and pulling the blade along the back side of the samples while maintaining tension. This motion results in dislodging of the coating on the front of the sample and it will come off of the current collector without contacting that side. The dislodged samples were relatively large flakes—not powder. The pore size distribution was determined using standard procedures with these flakes with an AutoPore Mercury Porosimeter.

Figure 8:
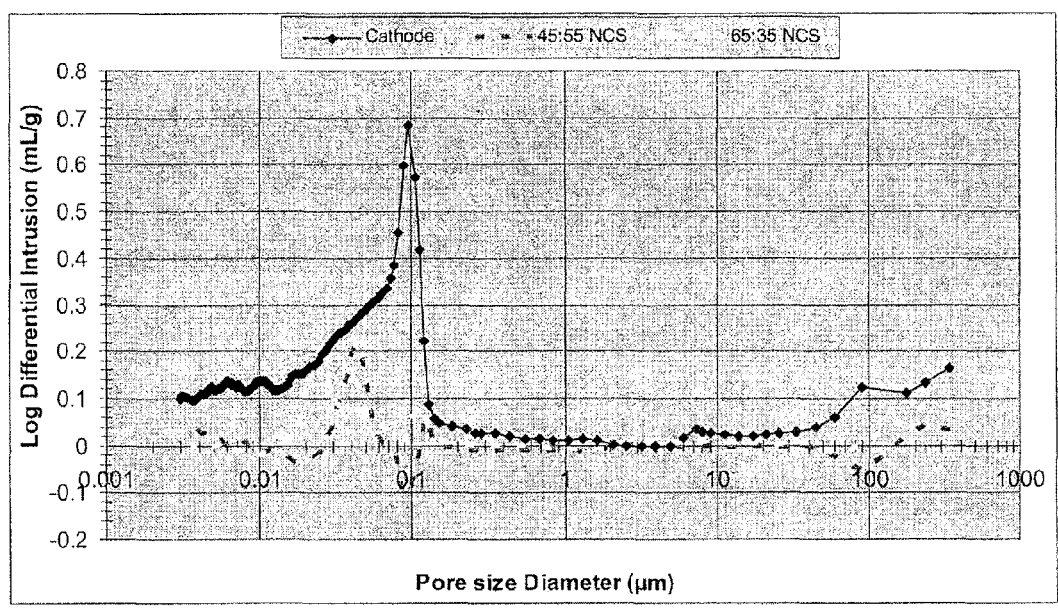
FIG. 8 is a plot showing pore size distribution for a porous composite membrane separator according to one or more embodiments.

Results are shown in FIG. 8. Because the separator samples also included cathode material, the pore size distribution for the cathode subtracted out from the separator samples, leaving, in the case of the 45-wt % fumed silica sample, with negative peaks. Pore sizes of 25 nm, 50 nm and 100 nm are clearly observed for separator of 65-wt % fumed silica sample. Pore sizes of 40 nm and 120 nm are clearly observed for separator of 45-wt % fumed silica sample. Thus, bimodal and multimodal pore size distribution is observed.

Example 7. Effect of Separator Cracks on Discharge Capacity

Cells were prepared using a fumed silica/PVDF system with different compositions and properties as set forth in Table 4 and are generally prepared as described above.

TABLE 4

| Composition of Test Cells | | | | |
|---|---|---|---|---|
| Cell Name | Fumed Silica (wt %) | PVDF (wt %) | Location of separator layer | comments |
| NCS Build 8 | 65 | 35 | 20 μm deposited on cathode/0 on anode | |
| NCS Build 9 | 45 | 55 | 20 μm deposited on cathode/0 on anode | |
| NCS Build 10 | 45 | 55 | 20 μm deposited on cathode/0 on anode | Cracks intentionally introduced |
| Wide | | | | Standard polyolefin |

In this table cells having a porous separator of varying compositions, without cracks and one which was used with deliberate cracks (build 10 in black). As well, the performance of a cell with a standard polyolefin separator was evaluated—this separator is made by Wide and the cell is simply called "Wide".

Figure 10:
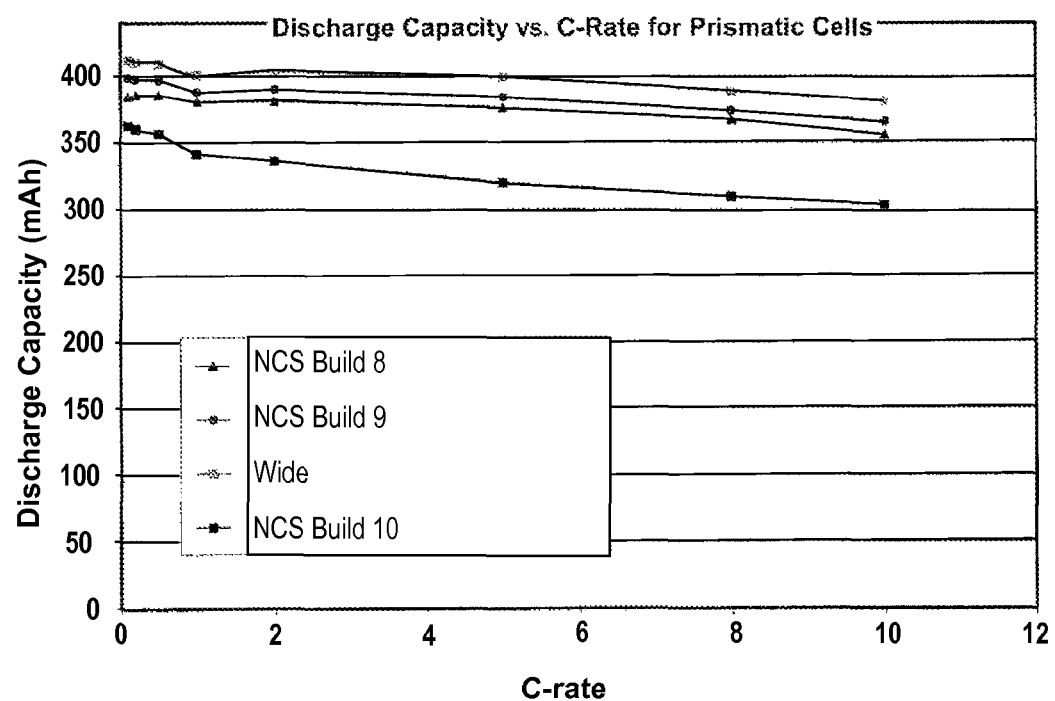
FIG. 10 is a plot of discharge capacity vs. C-rate for prismatic cells all having composite separators, in which case one composite separator has significant cracking in comparison to the others.

FIG. 10 is a the plot of capacity vs. C-Rate for the cells listed above in Table 4. An initial observation is that cells having high porosity separators (Build 8 and 9) have capacities that are comparable to commercially available porous polyolefin separators. NCS Build 10 was prepared from a high porosity separator that was deliberately treated to induce cracking. The reduced performance clearly shows that elimination of cracks is critical to high performance.

Example 8. Conductivity Measurements

Conductivity was measured using Li-Ion cells with the described separators and composite electrodes having PVDF binders as shown in Table 5. The anode was an MCMB graphitic carbon and the cathode was based on lithium iron phosphate. Electrolyte was a mixtures of carbonates and LiPF$_6$ salt. Cells impedance was measured when the cell voltage was >2.8 Volts open circuit. The complex impedance was measured over the frequency range of 0.01 Hz to 100,000 Hz using a Solartron Frequency generator and analyzer. The sinusoidal voltage was 5 mV peak to peak. The resistance is that value when capacitance is at a minimum at low frequencies—which is where the plot crosses the x-axis in a plot of imaginary vs. real impedance. These resistance values are converted into bulk conductibility based on the electrode cross-section and separator thickness.

TABLE 5

Conductivity Measurements of Exemplary Li-Cells.

| SAMPLE | CONDUCTIVITY (mS/cm) at 20μ |
|---|---|
| Commercial Polyolefin Separator of 20 microns thickness and 45% porosity | 0.55 |
| NCS 65:35 | 0.50 |
| NCS 45:55 | 0.30 |

These results indicate that the conductivity of the porous separator will vary with composition. In the present example, porous separators having a higher fumed silica content (65-wt %) had conductivity measurements that were comparable to commercial polyolefin separators. Reducing the inorganic particle content of the separator to 45-wt % resulted in a reduction in cell conductivity.

Example 9. Adhesion Testing

The relative adhesive strength of the porous separator to the electrode layer and the electrode layer are determined according to the following test.

TAPE TEST: Ordinary scotch tape is placed on the top of the substrate and secured by pressing with your finger—this turns the tape from translucent to clear. One edge is kept free of the substrate. This free edge is pulled away from the substrate with a fast motion.

PASS SEPARATOR ADHESION: The separator/electrode assembly is removed from the film substrate—leaving behind the metallic film substrate (current collector). This occurs because the separator/electrode interface is stronger than that of the electrode/current collector. This is the typical result.

FAIL SEPARATOR ADHESION: The electrode is revealed as dark region and the tape has the white deposit (separator is white). This has not yet occurred for any of the porous separator/electrode assemblies tested, indicating that there is a secure and robust bond between the porous separator and the porous electrode layer.

MANDREL TEST: A mandrel of 2 mm diameter is suspended at its ends on two mounting bars so that the majority of the center section is not constrained by the support structure. The film of appropriate length (this is approximately twice the length of the distance from the bar to the table on which it stands) is draped over the bar. Next it is rolled from one end to the other ten times with a force which pulls the film tightly across the bar—this is done by hand—the two ends are held in two hands. After ten pulls back/forth the test is complete. FAIL: particles of coating freely fall off the electrode PASS: Particles of film have not freely fallen from the electrode, and so it is next examined under light microscope at about 100× and there is not significant cracking. This experiment is used to test the adhesion of a film to a substrate—most notably it is used to test if the active material is able to maintain adhesion to the current collector in both extension and compression similar to what is encountered in a wound cylindrical cell The foregoing illustrates one specific embodiment of this invention. Other modifications and variations of the invention will be readily apparent to those of skill in the art in view of the teaching presented herein. The foregoing is intended as an illustration, but not a limitation, upon the practice of the invention. It is the following claims, including all equivalents, which define the scope of the invention.

The invention claimed is:

1. A laminate electrochemical cell, comprising:
   a stack of layers arranged to provide a positive electrode layer/separator layer/negative electrode layer/separator layer repeat unit, where:
   the positive electrode layer comprises a porous composite positive electrode layer adhered to both sides of a positive current collector, said positive electrode layer comprising at least electroactive particles and a binder;
   the negative electrode layer comprises a porous composite negative electrode layer adhered to both sides of a negative current collector, said negative electrode layer comprising at least electroactive particles and a binder; and
   each separator layer comprises a porous composite separator layer comprising inorganic particles substantially uniformly distributed in a polymer matrix to form nanopores,
   wherein each polymer matrix of each separator layer has at least a bimodal pore distribution with pores of at least two different sizes, wherein a first pore size is in the range of 5-100 nm, and a second pore size is in the range of 100-500 nm, wherein pores having the first pore size are uniformly distributed in each separator layer and pores having the second pore size are randomly distributed in each separator layer,
   wherein each separator layer is bonded to an adjacent electrode layer through a solvent weld formed via application of a coating solution including a solvent to the adjacent electrode layer, the solvent weld comprising a co-mingled mixture of the binder of the adjacent electrode layer and a polymer of the polymer matrix of the separator layer at an interface between the separator layer and the adjacent electrode layer,
   wherein the coating solution solubilizes the binder of the adjacent electrode layer with the solvent, the binder having a lesser solubility in the solvent as compared to a solubility of the polymer in the solvent, and
   wherein the solvent does not penetrate more than 50 percent of the adjacent electrode layer.

2. The laminate electrochemical cell of claim 1, wherein each separator layer comprises about 40-65 wt % polymer.

3. The laminate electrochemical cell of claim 1, wherein each separator layer has a pore volume fraction of at least 25%.

4. The laminate electrochemical cell of claim 1, wherein resistance of the cell is greater than 20 MΩ.

5. The laminate electrochemical cell of claim 1, wherein the cell further comprises an electrolyte.

6. The laminate electrochemical cell of claim 1, wherein each separator layer has a total thickness in the range of about 2 μm to about 40 μm.

7. The laminate electrochemical cell of claim 1, wherein the inorganic particles of each separator layer are substantially monodisperse and have a particle size with a value in the range of about 10-500 nm.

8. The laminate electrochemical cell of claim 1, wherein the inorganic particles of each separator layer are substantially monodisperse and have a particle size with a value in the range of about 10-50 nm.

9. The laminate electrochemical cell of claim 1, wherein each separator layer comprises inorganic particles and polymer in a weight ratio of about 65:35 to about 45:55, and wherein the inorganic particles have a specific surface area of 50-200 m$^2$/g.

10. The laminate electrochemical cell of claim 1, wherein the solvent comprises a mixture of a first solvent and a second solvent, the second solvent having a lower solubility for the binder of the adjacent electrode layer as compared to a solubility of the first solvent for the binder of the adjacent electrode layer.

11. A laminate electrochemical cell, comprising:
a stack of layers arranged to provide a positive electrode layer/first separator layer/negative electrode layer/second separator layer repeat unit, where:
the positive electrode layer comprises a porous composite positive electrode layer adhered to both sides of a positive current collector, the positive electrode layer comprising at least electroactive particles and a first binder;
the negative electrode layer comprises a porous composite negative electrode layer adhered to both sides of a negative current collector, the negative electrode layer comprising at least electroactive particles and a second binder; and
each separator layer comprises a porous composite separator layer comprising inorganic particles substantially uniformly distributed in a polymer matrix to form nanopores,
wherein the first separator layer is bonded to the positive electrode layer through a solvent weld that comprises a co-mingled mixture of the first binder of the positive electrode layer and a polymer of the polymer matrix of the separator layer at an interface between the separator layer and the positive electrode layer, wherein the solvent weld is formed by solubilization of the first binder of the positive electrode layer with a first solvent and solubilization of the polymer of the polymer matrix of the separator layer with a second solvent, where the first binder has a lower solubility in the second solvent than a solubility of the polymer in the second solvent.

12. A laminate electrochemical cell, comprising:
a stack of layers arranged to provide a positive electrode layer/first separator layer/negative electrode layer/second separator layer repeat unit, where:
the positive electrode layer comprises a porous composite positive electrode layer adhered to both sides of a positive current collector, the positive electrode layer comprising at least electroactive particles and a first binder;
the negative electrode layer comprises a porous composite negative electrode layer adhered to both sides of a negative current collector, the negative electrode layer comprising at least electroactive particles and a second binder; and
each separator layer comprises a porous composite separator layer comprising inorganic particles substantially uniformly distributed in a polymer matrix to form nanopores,
wherein the first separator layer is fused to the positive electrode layer by a spraying or gravure coating process using a coating solution including a solvent that penetrates less than 50% of a thickness of the positive electrode layer and dissolves only a portion of the first binder to form a solvent weld at an interface between the separator layer and the positive electrode layer upon removal of the solvent.

13. The laminate electrochemical cell of claim 12, wherein the coating solution comprises solids mixed with the solvent with a solid content of 7% or greater, the solids including inorganic particles and polymer.

* * * * *